(12) United States Patent
Makatsoris et al.

(10) Patent No.: US 9,446,366 B2
(45) Date of Patent: Sep. 20, 2016

(54) MODULAR FLOW REACTOR

(71) Applicant: Brunel University, Uxbridge Middlesex (GB)

(72) Inventors: Charalampos Makatsoris, Uxbridge Middlesex (GB); Leonid Paramonov, Uxbridge Middlesex (GB); Rakan Alsharif, Uxbridge Middlesex (GB)

(73) Assignee: Brunel University (GB)

( * ) Notice: Subject to any disclaimer, the term of this patent is extended or adjusted under 35 U.S.C. 154(b) by 170 days.

(21) Appl. No.: 14/349,746

(22) PCT Filed: Oct. 4, 2012

(86) PCT No.: PCT/GB2012/052456
§ 371 (c)(1),
(2) Date: Apr. 4, 2014

(87) PCT Pub. No.: WO2013/050764
PCT Pub. Date: Apr. 11, 2013

(65) Prior Publication Data
US 2015/0010445 A1 Jan. 8, 2015

(30) Foreign Application Priority Data
Oct. 4, 2011 (GB) .................................. 1117064.4

(51) Int. Cl.
*B01J 8/06* (2006.01)
*B01J 19/00* (2006.01)

(52) U.S. Cl.
CPC *B01J 8/06* (2013.01); *B01J 8/067* (2013.01); *B01J 19/0093* (2013.01); *B01J 2219/00783* (2013.01); *B01J 2219/00806* (2013.01); *B01J 2219/00808* (2013.01); *B01J 2219/00822* (2013.01); *B01J 2219/00824* (2013.01); *B01J 2219/00833* (2013.01); *B01J 2219/00835* (2013.01); *B01J 2219/00849* (2013.01); *B01J 2219/00873* (2013.01);
(Continued)

(58) Field of Classification Search
CPC .................................. B01J 8/06; B01J 8/067
USPC .............................. 422/129, 198, 631; 48/61
See application file for complete search history.

(56) References Cited

U.S. PATENT DOCUMENTS

| 4,446,111 A * | 5/1984 | Halene et al. ................ 422/200 |
| 5,580,523 A | 12/1996 | Bard | |
| 6,991,770 B2 * | 1/2006 | Suzuki et al. ................ 422/198 |

(Continued)

FOREIGN PATENT DOCUMENTS

| DE | 199 17 398 A1 | 10/2000 |
| EP | 1 352 686 A1 | 10/2003 |

(Continued)

*Primary Examiner* — Huy-Tram Nguyen
(74) *Attorney, Agent, or Firm* — Craig A. Fieschko, Esq.; DeWitt Ross & Stevens S.C.

(57) ABSTRACT

A modular flow reactor is formed of a plurality of modules, wherein each module comprises a body having at least one conduit passing therethrough, and wherein a plurality of said modules are aligned along a longitudinal axis such that said conduits of said modules are aligned to form a passage for fluid, wherein each module has a length along said longitudinal axis which is less than the length of the module perpendicular to the longitudinal axis. The modules are "slices" rather than "tubes" and a plurality of said modules can be aligned linearly so that the conduits form a tube.

29 Claims, 9 Drawing Sheets

(52) U.S. Cl.
CPC ............... *B01J 2219/00889* (2013.01); *B01J 2219/00896* (2013.01); *B01J 2219/00907* (2013.01)

(56) References Cited

U.S. PATENT DOCUMENTS

| | | | |
|---|---|---|---|
| 6,993,888 B2 * | 2/2006 | Yang et al. | 53/447 |
| 7,726,331 B1 | 6/2010 | Giese | |
| 2001/0006611 A1 * | 7/2001 | Koski et al. | 422/225 |
| 2002/0045265 A1 | 4/2002 | Bergh et al. | |
| 2004/0065171 A1 * | 4/2004 | Hearley et al. | 75/255 |
| 2006/0224006 A1 | 10/2006 | Clements | |
| 2011/0224463 A1 | 9/2011 | Zikeli et al. | |

FOREIGN PATENT DOCUMENTS

| | | |
|---|---|---|
| WO | WO 03/078044 A2 | 9/2003 |
| WO | WO 2006/105870 A1 | 10/2006 |
| WO | WO 2007/050013 A1 | 5/2007 |
| WO | WO 2007/060412 A1 | 5/2007 |
| WO | WO 2007/065211 A1 | 6/2007 |
| WO | WO 2007/112945 A1 | 10/2007 |
| WO | WO 2008/122812 A2 | 10/2008 |

* cited by examiner

MODULAR FLOW REACTOR

FIELD OF THE INVENTION

The present invention relates to a modular flow reactor and to a module for said reactor. In particular, it relates to a reactor which can be assembled and disassembled easily for cleaning, can be manufactured by means of additive manufacturing techniques, including 3D 'printing' or a variety of conventional manufacturing techniques at low cost and which can have different functions depending on the needs of a variety of synthesis or formulation schemes permitting access to a range of conditions.

BACKGROUND OF THE INVENTION

Chemical synthesis is still driven to fit available apparatus and new chemical processes are largely designed and executed without taking into consideration the best reactor configuration or (importantly) scalability for pilot or market scale production. Currently, discovery generally takes place in conventional round flask (or batch) reactors. However, flow reactors are becoming increasingly important in discovery and synthesis of new molecules and processes.

Flow reactors (sometimes called continuous reactors) are in their simplest form tubes along which a fluid is able to flow and within which a reaction is able to take place. They promote the use of continuous processing that is inherently scalable with the potential of seamless transition from discovery to industrial scale production. Although they have been around for a while and a number of supporting studies have been conducted, flow reactors are used very rarely at the moment on a routine basis and only by a small number of laboratories. A number of other laboratory scale reactor designs have been proposed but their use is still very limited with scalability being questionable.

Reactor configurations in current research efforts are largely ad hoc and focused on specific conditions of (for example) temperature and pressure. Because of this specificity, the configurations in question do not easily permit access to a wide range of operating conditions or provide support for studies relating to optimal synthetic route selection and reaction optimisation, without redesign and assembly. Additional apparatus is also required for monitoring, probing, measuring, data collection etc. that must be integrated into the reactor, which typically raises the cost and requires additional effort for integration and calibration. Finally, replication of reported reactions across laboratories is not easy as it requires considerable effort to replicate the reported configuration with substantial consequent trial and error.

A prior art flow reactor is shown in FIG. 1. The oscillatory baffled reactor (OBR) 1 consists of a cylindrical tube 2 in which orifice baffles 3 are placed at equal distance and in which fluid is made to oscillate. This arrangement ensures efficient and controlled mixing and effective heat transfer. Eddies are generated when fluid flow passes through the baffles allowing considerable radial motions, and where actions at the wall are of the same magnitude as they are at the centre of the tube. Uniform mixing in each baffled cell is caused by generation and cessation of eddies, collectively along the tube. This type of reactors have the capability to perform reactions that require long residence times at greatly reduced length-to-diameter ratios and maintain nearly a plug flow pattern. The combination of baffles and the oscillatory motion creates a flow pattern and mixing nearly independent of the net flow at a wide range of values for amplitude and frequency of oscillation. Furthermore, the mixing is sufficient to handle multi phase flows including combinations of gas, liquids and solids as well as slurries allowing the application of this type of reactor to a wide range of applications.

WO 2008/122812 A2 (Nitech Solutions Ltd) discloses such a prior art flow reactor. Specifically, the invention relates to a tubular mixing apparatus and a process for applying oscillatory motion to a mixture. A tubular vessel is equipped with a plurality of annular baffles mounted on rails. Those baffle trains are being provided within the vessel to maintain mixing and dispersion of a substance within the vessel. A plurality of such tubular vessel systems maybe assembled using bends providing an S-shaped or serpentine configuration.

WO 2007/060412 A1 (Nitech Solutions Ltd) teaches a method and apparatus for controlling temperature for the said tubular flow reactor in WO 2008/122812 A3.

WO 2007/065211 (Acqua International Group Inc) discloses a compact reactor which is assembled in the form of modules of individual reactor elements interconnected together. The reactor elements are a selection of straight reactor elements and curved reactor elements of single type or comprising multiple pipes. Alternate straight and curved elements are connected together in a serpentine configuration.

EP 1352686 (Inst. Angewandte Chemie Berlin) discloses a modular process device comprising a row of modular connecting points which are generally cubic in shape for fluidic, electrical, sensor and/or digital material streams. The cubic shape enables the modules to be branched horizontally or vertically in three dimensions.

WO 03/078044 (H2GEN Innovations, Inc) discloses a cross-flow heat exchange reactor including a housing, a plurality of tubes mounted in the housing for carrying a first liquid, and a baffle having a plurality of holes receiving the tubes which is configured to allow second fluid to flow within the housing in a direction generally perpendicular to the tubes.

U.S. Pat. No. 5,586,523 (Bard) discloses a microfluidic modular reactor system which handles fluid volumes in the range of one nanoliter to ten microliters. It is questionable whether this system is scalable to the mesoscale.

US 2002/0045265 (Symyx Technologies Inc) also relates to a microfluidic system, namely a parallel flow reaction system comprising four or more reaction channels. Again, it is questionable how scalable this design is.

US 2006/0224006 A1 (Renewable Products Dev Lab) discloses a process for producing Biodiesel or fatty acid esters from multiple triglyceride feedstocks. The process takes place within three tubular vessels coupled sequentially. Each tubular vessel contains a plurality of static mixing elements.

US2011/0224463 A1 (Zikeli et al.) discloses a modular microreactor system composed of microreactor parts including a plate to accommodate separate reaction tubes with different shapes within which turbulent mixing or reactions can occur. The reaction tubes in that invention are preferably capillaries with an inner diameter of 0.05 mm to 1 mm. The microreactor parts are linked with separate connection elements.

SUMMARY OF THE INVENTION

In a first aspect of the invention, there is provided a modular flow reactor formed of a plurality of modules, wherein each module comprises a body having at least one conduit passing therethrough, and wherein a plurality of said modules are aligned along a longitudinal axis such that said conduits of said modules are aligned to form a passage for fluid. This is the invention in its broadest form and it can be modified by including any of the features defined in embodiments described below, either separately of in any combination.

In one embodiment, each module has a length along said longitudinal axis which is less than the length of the module perpendicular to the longitudinal axis. In other words, the modules in question are 'slices' rather than 'tubes' and a plurality of said modules can be aligned linearly so that the conduits form a tube. This is in contrast to the prior art reactors in which a plurality of tubes are placed parallel to each other and linked by U-shaped end sections to form a sinusoidal flow reactor.

The technical advantage of providing the modules in slices is that they can be constructed by using additive printing techniques (including 3D printing) as well as by conventional manufacturing techniques. This reduces manufacturing costs and results in a number of other benefits (see below).

In its broadest form, this invention is concerned with a new type flow reactor that is modular, scalable and reconfigurable. The reactor comprises of any number of standard sections that, once assembled together, combine into a continuous flow chemical reactor system of a desired length. A section comprises a number of conduits, the diameters of which could vary, that once assembled together form a reactor vessel. In addition, a section comprises additional conduits for allowing flow of heating or cooling fluid.

As well as the manufacturing advantages mentioned above, other advantages of this sectioned design include: ability to line cavities with for example chemically reactive or catalytic material; ability to take apart for cleaning and reassembly; ability to assemble into any length; compactness; ability to add monitoring and measuring ports or injection ports attached to each cavity; integrated temperature control via cooling or heating fluid flow; ability to combine a variety of reactor designs into the same compact arrangement including a mixture of standard plug flow with baffled flow designs; and the ability to include blades instead of standard straight walled orifice for different mixing regimes. In addition, the design can act as a standard platform that can be replicated across different laboratories to repeat reliably reaction processes only by selecting and assembling the same number and design of modules.

In another embodiment, the reactor comprises at least one reinforcing element for passing through said passage in order to link the modules together.

The reactor may have a plurality of said passages in parallel.

In a preferred embodiment, the reactor additionally comprising at least one end-cap for fitting to at least one end of the reactor, wherein the end-cap has at least one conduit (which may be threaded to allow the attachment of standard threaded tubes) which is of smaller internal diameter than the conduit of the reactor passage.

In another embodiment in which the reactor has at least two passages formed by the alignment of conduits, the end-cap has a connector to fluidly connect said passages together. In will be appreciated that the reactor preferably has multiple passages (perhaps from 5 to 10 baffled conduits and from 15 to 30 baffle-free conduits) in which case the end-cap can be designed to connect multiple passages to each other to create parallel and/or sequential flowpaths through the reactor and/or to provide connection points for external tubes.

The reactor in its broadest form may include at least one module which has at least one baffle to disrupt flow of fluid through said at least one conduit. The baffle and the body of the module are preferably integrally formed. However, the reactor may also have at least one module which is baffle-free.

In a preferred embodiment, the baffle is a region in the conduit of reduced internal diameter. The internal diameter of the region of the baffle is preferably about half of the internal diameter of the conduit in the baffle-free region. Independently, the length of the region of the baffle along the longitudinal axis of the conduit may be about a quarter of the length of the baffle-free region of the conduit.

An important technical advantage of the reactor is that it can be constructed from modules with differing functionality depending on the needs of the user. For example, modules can be provided with one or more of the following functionalities:

a port for allowing access to the at least one conduit
the port may be connected to a fluid injection device, a fluid measuring device, a fluid monitoring device or is an observation port
a catalyst which is positioned so as to contact any fluid flowing through the at least one conduit (for example it may be provided in the conduit lining)
support material (for example glass beads) which is positioned so as to contact any fluid flowing through the at least one conduit
a membrane for separating components of a fluid passing therethrough In a second aspect of the present invention, there is provided a module for a modular reactor as defined above. In one embodiment, a face of the module body at one end of the conduit has a projection and a face of the body at an opposite end of the conduit has a corresponding depression, whereby said projection can engage with a depression on a second identical module when the two conduits are aligned.

In a further aspect of the invention, there is provided a section for a modular flow reactor, comprising a body having at least one conduit passing there through along a first axis and at least one baffle to disrupt flow of fluid through said at least one conduit, wherein the body is configured such that the conduit of the body and the conduit of a second identical section can be aligned to form a passage for fluid in a modular flow reactor, and wherein the at least one baffle and the body are integrally formed. A modular reactor may also be provided which comprises a plurality of said sections, wherein the conduits of said sections are aligned to form a passage for fluid in the reactor.

BRIEF DESCRIPTION OF THE DRAWINGS

A number of preferred embodiments of the invention will now be described with reference to the following drawings, in which.

DETAILED DESCRIPTION OF PREFERRED VERSIONS OF THE INVENTION

Figure 1:
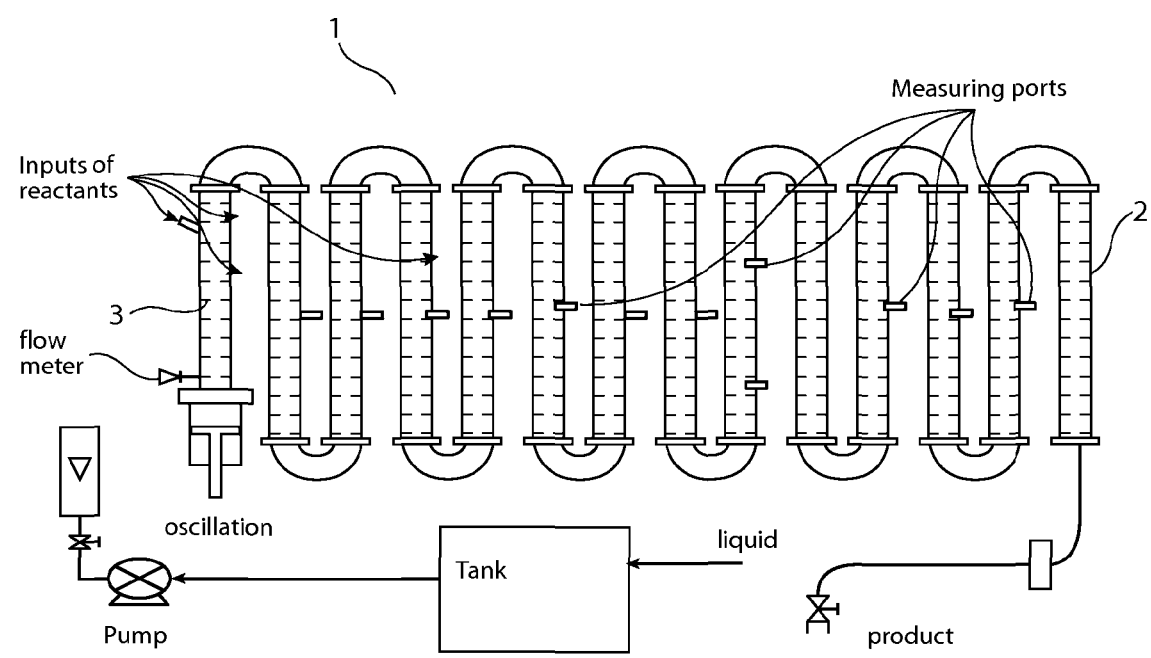
FIG. 1 is a schematic diagram of a prior art oscillatory baffled reactor.
Figure 2A:
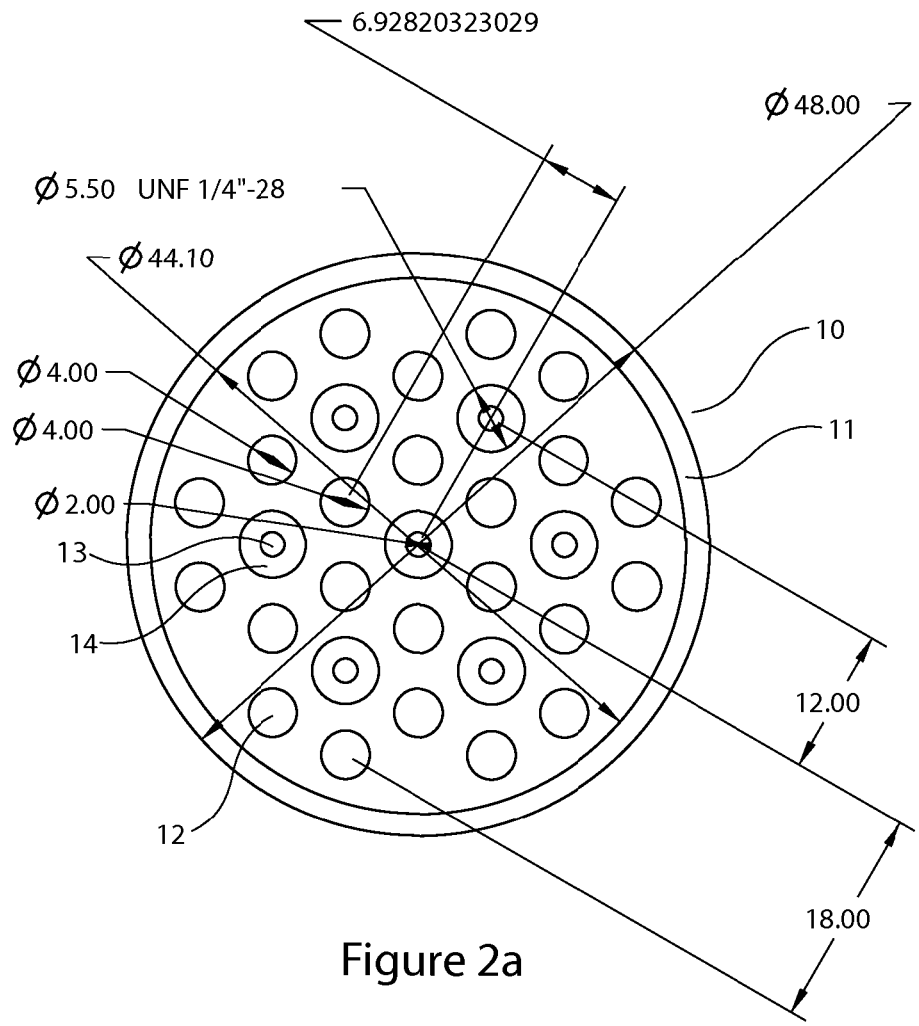
FIGS. 2a and 2b depict in cross-section and in cutaway side view an end section of a reactor in accordance with the invention.
Figure 2B:
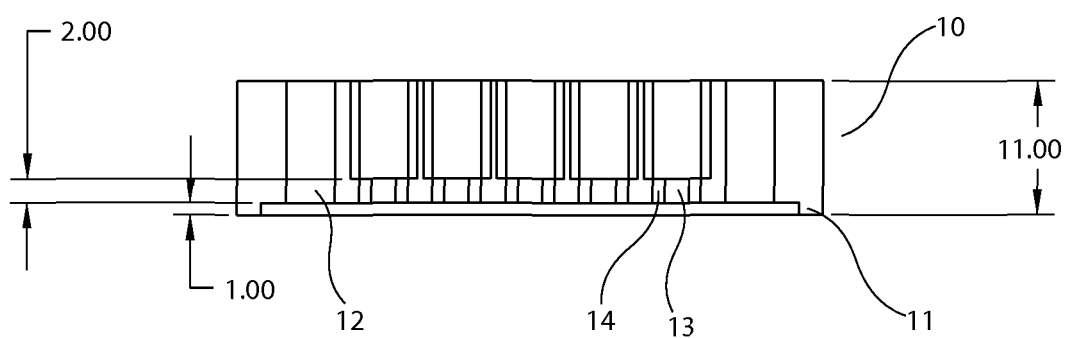
Figure 3A:
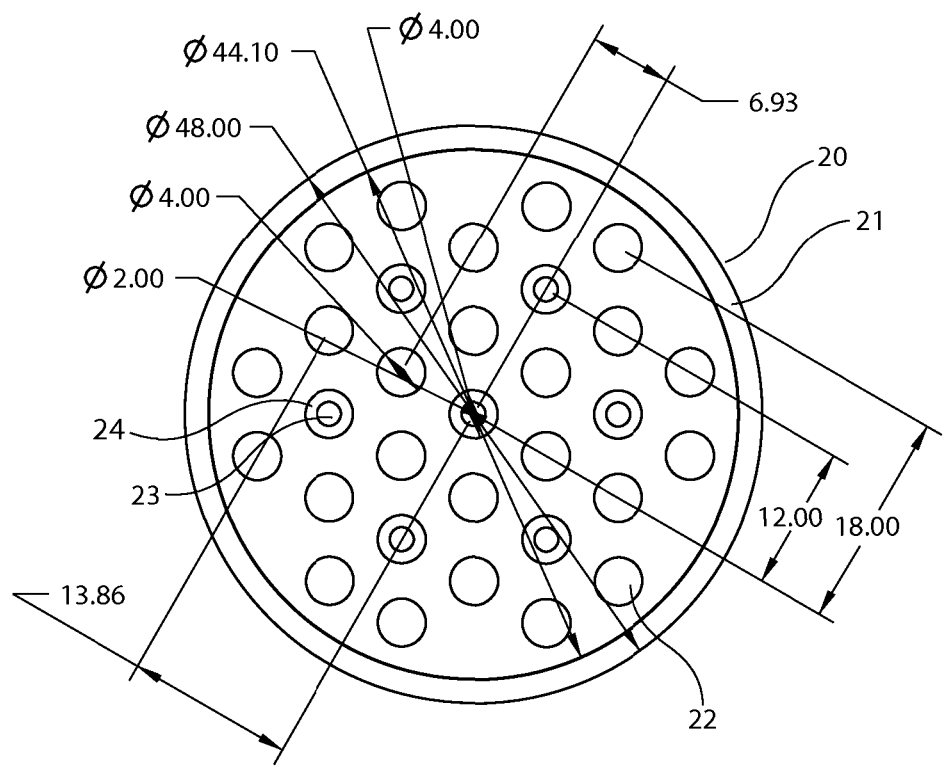
FIGS. 3a and 3b depict in cross-section and in cutaway side view a mid-section of a reactor in accordance with the invention.
Figure 3B:
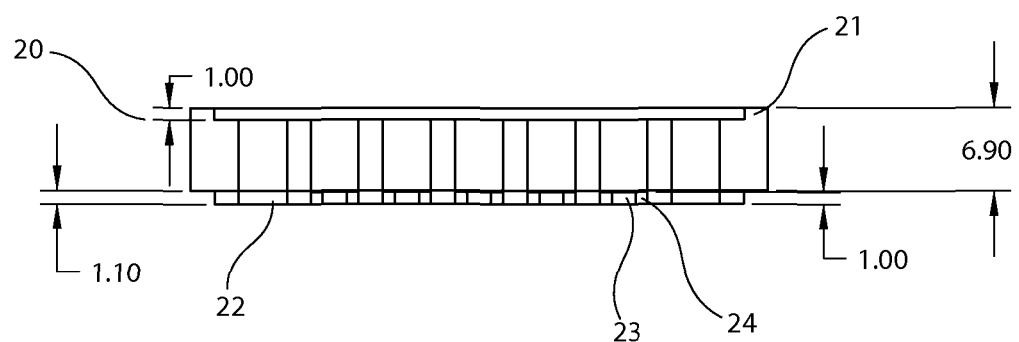
Figure 4A:
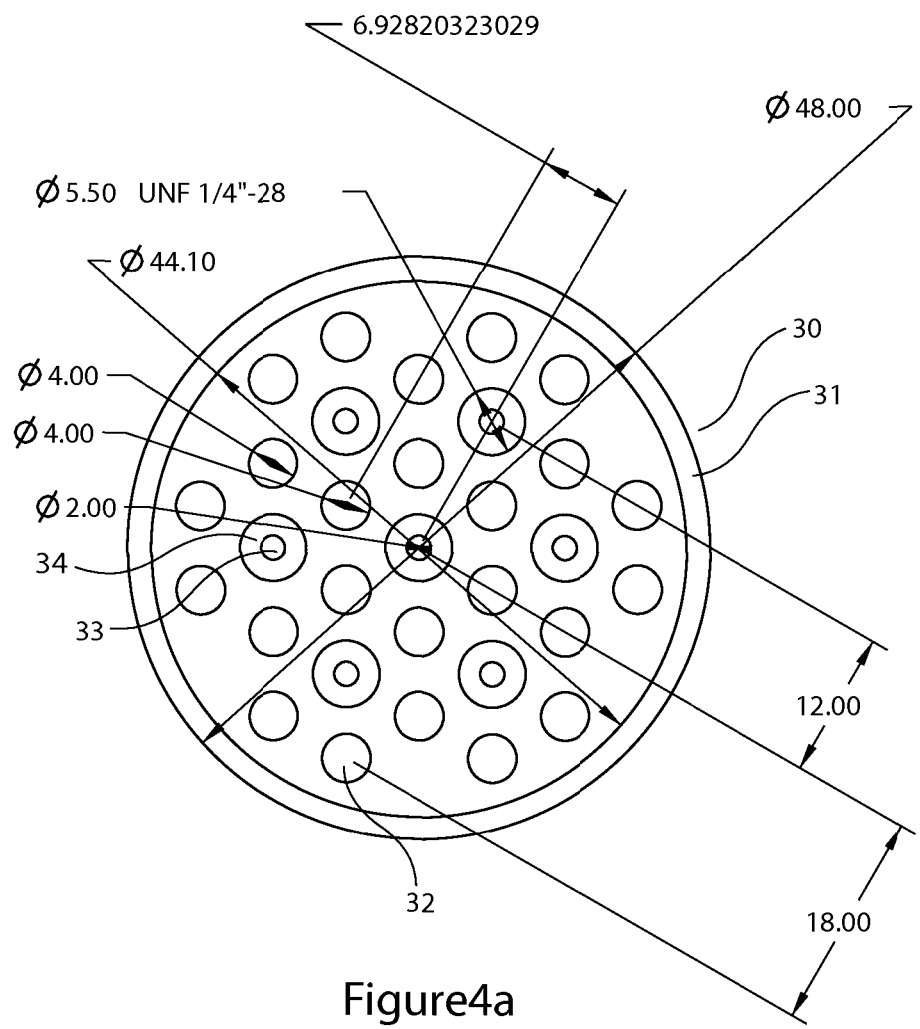
FIGS. 4a and 4b depict in cross-section and in cutaway side view an end section of a reactor in accordance with the invention.
Figure 4B:
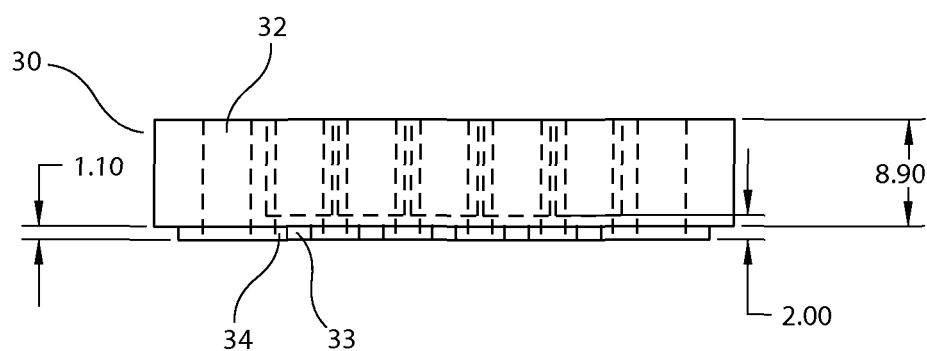

A modular reactor in accordance with the invention comprises an end slice (designated a left hand end slice) 10, twenty four mid-slices 20 and a right hand end-slice 30 as shown in FIGS. 2, 3 and 4 respectively. A more detailed schematic side view of mid-slice 20 can be seen in FIG. 5.

Each of the slices 10, 20, 30 is formed of a drilled stainless steel plate but equally could be formed of a ceramic or plastics material, the latter being either drilled or formed by means of additive manufacturing techniques such as 3D printing. Each of the slices comprises a generally circular body having lip 11, 21, 31, a plurality (7 in this case) of baffled conduits 13, 23, 33 each of which has a baffle 14, 24, 34 formed of a conduit section of reduced internal diameter and a plurality (26) in this case) of baffle-free conduits 12, 22, 32 arranged so that each baffled conduit is surrounded by six baffle-free conduits arranged symmetrically in a circular pattern.

Each mid-slice 20 is preferably substantially identical and the relationship of the various dimensions is preferably as defined below:

| Parameters |
| --- |
| D = baffled conduit diameter |
| d = baffle diameter |
| $D_u$ = baffle free conduit diameter |
| T = overall thickness of section along first axis |
| $L_{bc}$ = length of baffled conduit (excluding baffle thickness) along first axis |
| $t_b$ = baffle thickness along first axis |
| $L_{uc}$ = length of baffle free conduit along first axis |
| $T_r$ = depth of recess, which is optional and used to better align sections |
| $\alpha$ is the ratio between $L_{cb}$ to D |
| $\beta$ is the ratio between d to D where $0 < \beta \leq 1$ |
| $\gamma$ is the ratio between $L_{bc}$ to $t_b$ where $0 < \gamma \leq 0.5$ |
| $\delta$ is the clearance between the rim of the recess of previous section and the projection of the next that slots into the previous section |

| Overall Section thickness |
| --- |
| $T = t_b + t_r + L_{bc} = t_r \cdot \alpha \cdot D (\gamma + 1)$ |
| where |
| $0 \leq t_r < L_{bc} + t_b - \delta$ |
| $0 \leq \delta < L_{bc} + t_b$ |

| Relationships for baffled conduits |
| --- |
| $t_b = \gamma \cdot L_{bc}$ |
| $d = \beta \cdot D$ |

| Relationships for baffle free conduits |
| --- |
| $L_{uc} = t_b + L_{bc} = t_b + L_{bc} = \alpha \cdot D (\gamma + 1)$ |

| Design parameters used in prototype |
| --- |
| $D_u = D$ |
| $\alpha = 1.5$ |
| $\beta = 0.5$ |
| $t_b = 1$ mm |
| $T = t_b + t_r + L_{bc} = t_r + \alpha \cdot D (\gamma + 1)$ |
| $t_r = 1$ mm |
| $\delta = 0.2$ mm |

Figure 5:
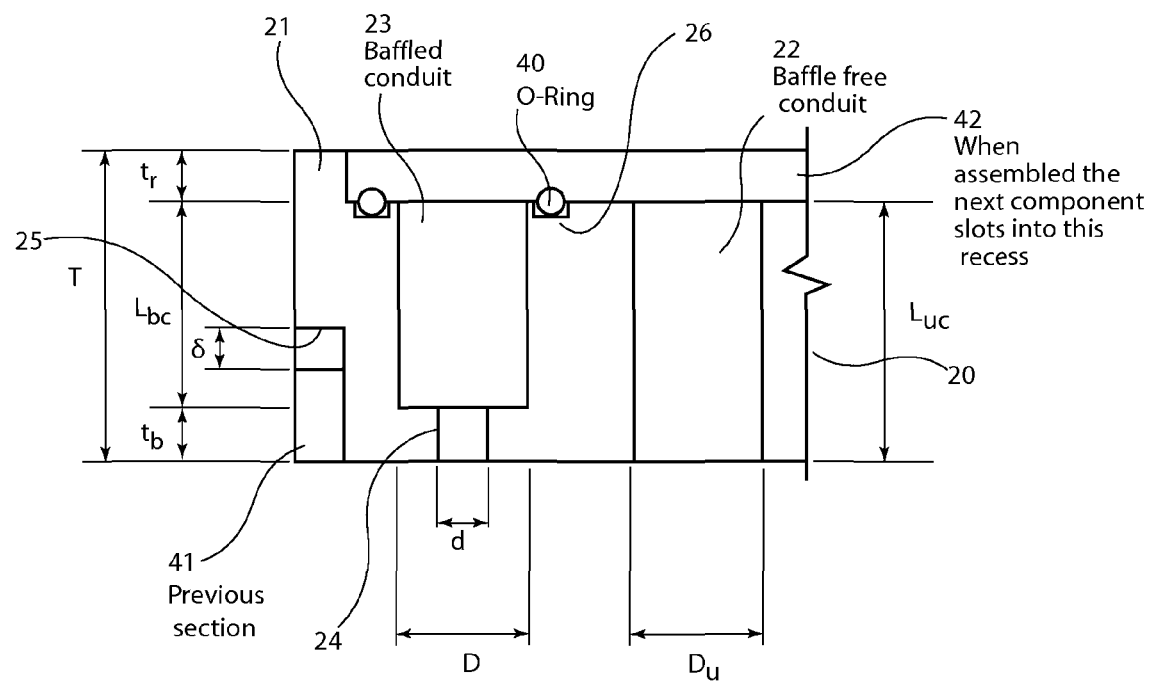
FIG. 5 is a partial side view of the mid-section as depicted in FIG. 3.

Each mid-slice 20 has a recessed section below lip 21 forming a shoulder 25 and FIG. 5 shows how the lip 41 of an adjoining mid-slice (not shown) fits into the recess section below should 25 thus allowing to adjoining slices to fit together. It can be seen as a gap delta is formed between should 25 and lip 41.

For each mid slice 20 also comprises an O-ring 40 which sits in an annular channel 26 around baffled conduit 23 and which forms a seal with the adjoining slice (not shown).

Left hand end-slice 10 and right hand end-slice 30 differ from mid-slice 20 in that the baffled conduits 13, 33 and (optionally) the baffle-free conduits 12, 32 have screw-thread sections for attaching standard chromatographic tubes. Alternatively, the end-slices 10, 30 may have tubes integrated into their structure.

In an alternative embodiment, end-slices 10, 30 may have connecting channels (not shown) to connect two or more reactor conduits and thereby direct fluid flow from one conduit into another (in an opposite direction along the reactor).

In use, the modular reactor (not shown) is assembled by fitting together 24 mid-slices 20 so as to align the baffled conduits 23 and the baffle-free conduits 22. A series of rods (not shown) can then be inserted into the passage way formed by some of the baffle-free conduits 22 in order to hold the slices 20 together. Left and end-slice 10 and right hand end-slice 30 are then fitted onto either end of the reactor by means of recessed sections aligning with corresponding overhangs on the adjacent slice.

The reactor has been prototyped in stainless steel and PTFE. It comprises three sections that can be assembled in any desired quantity to obtain any length reaction vessel:

A. One section (shown in FIG. 2) consists of a drilled stainless steel plate of Ø60 mm OD and 11 mm thick which is the LHS end cap B. Another section (shown in FIGS. 3 and 5) consists of a drilled stainless steel plate of Ø60 mm OD and 8 mm thick. This section contains the actual reaction vessels.

C. The third section (shown in FIG. 4) consists of a drilled stainless steel plate of Ø60 mm OD and 10 mm thick. This plate has 31 holes of different sizes in diameter drilled on to it. This is the RHS end cap.

The main function of the holes is different which is to be used either as heat addition or removal by means of heating or cooling fluid, the actual reaction chamber with an integrated baffle and finally a set of holes used for assembly by means of tightening rods.

The diameter of the baffled conduit was Ø4 mm. Thickness of the baffle was 1 mm. Total length of single pass baffled tube was 185 mm, there were total 7 passes, providing total length 1295 mm of baffled tubes. These baffled tubes were connected by the chromatographic tubing of ⅛"OD (3.175 mm) and 1/16"ID (1.5875 mm) and approximate length of the chromatographic tubing was 1100 mm.

Each tube had 24 baffle cavities (the space between successive baffles). Total number of baffle cavities over the reactor length were 168 after assembling every section together, with 2 mm dia. ($d_0$=2 mm) orifice, thickness of baffle was 1 mm and spacing between baffles was kept standard 1.5 times tube diameter of 4 mm, provided with constriction ratio of (S=$d_0$/d) 0.5, were $d_0$=orifice diameter and d=tube diameter. All the flangeless fittings (flangeless nuts, ferrules, cross manifold) for connecting reactor tubes with chromatographic tubes were used from Idex (Health and Science)®. Two different sizes of FPM O-ring from Barnwell® were used, to avoid the leakage from the reactor. 1) 14 nos. of (0030-10 VIT75) FPM O-Ring of 3 mm diameter were used in between for connecting chromatographic tubes to reactor tubes, similarly 2) 175 nos. of (0050-15 VIT75) FPM O-Ring of 5 mm diameter were used in between for assembling stainless steel plates, for sealing purpose.

Prototype Characteristics

Volume of the Baffled Tube:
  Internal Diameter=d=4 mm
  Area of baffled tube=A=$\pi r^2$=12.566 mm$^2$
  Length of single pass=185 mm
  No. of baffled tubes=7
  Overall length of baffled tubes=L=1295 mm
  Volume of baffled tubes=V=A×L=16273 mm$^3$=16.273 mL Volume of Chromatographic Tubing:
  Internal Diameter=$d_c$=1.5875 mm
  Area of chromatographic tubing=1.98 mm$^2$
  Overall length of the chromatographic tubing=1100 mm (approximate)
  Volume of the chromatographic tubing=V=A×L=2.178 mL
  Overall volume of the system=V=16.273+2.178=18.45 mL Example 1

Biodiesel Production Using the Reactor

The reactor of the present invention has been efficiently used for the production of the biodiesel, using a transesterification process of rapeseed vegetable oil and solution of methanol and NaOH.

Transestrification Process:

Rapeseed oil was continuously supplied at a flowrate of 5 ml/min with a temperature maintained in the range of 50-60° C., and solution of methanol and NaOH was continuously supplied at a flowrate of 1.5 mL/min with a temperature maintained in between 40-50° C. Thus, depending on the overall volume of 18.45 mL of the reactor, the production capacity achieved for this reactor was in between 5-6 mL/min. Overall mixture of methyl ester & glycerol solution of 450 mL approximately was produced in a single run of the experiment in just over an hour; ie. the product obtained through this process has undergone a sufficiently long reaction process to produce biodiesel. The ratio between rapeseed oil and solution of NaOH and methanol was maintained at 6:1.

(The colour of the mixture changed from a translucent yellow colour to an opaque light brown, resulting from the transesterification process generating heat). The process was run for 20-30 minutes, during which time the solution exiting the reactor showed two separate layers of methyl esters (biodiesel) and glycerol.

Full Experimental Details

Figure 6:
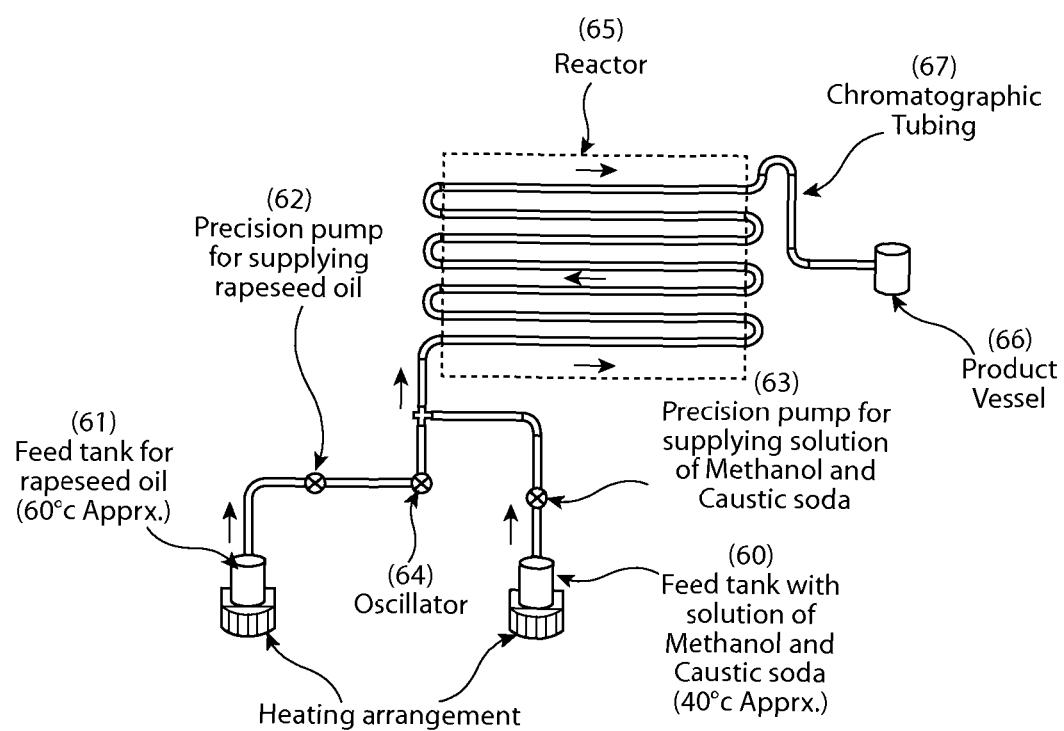
FIG. 6 is a schematic layout of the experimental apparatus for the use of the reactor of the present invention in biodiesel production.

Step 1:
The clean reactor was completely set up for biodiesel production was equipped as shown in FIG. 6.

Step 2:
Solid NaOH was dissolved in pure methanol in the ratio of 3-4 gm per 100 ml. This solution was stored in a 500 ml glass bottle, which was used as feed tank 60. The solution was prepared and maintained in between 40-50° C. at least for 1 hr. before each experiment was performed. The other feed tank 61 (another 500 mL glass bottle) contained rapeseed oil, and the temperature of the oil was maintained in between 50-60° C.

Step 3:
A continuous flow rate of 5 ml/min was set for supplying the rapeseed oil, for this purposely built code was used in LabVIEW software. Similarly continuous flow rate of 1.5 mL/min was set for supplying NaOH and Methanol solution from its feed tank using LabVIEW code. Two separate precision pumps 62,63 were used for supplying both rapeseed oil and solution of NaOH and methanol to reactor 65.

Step 4:
One oscillatory bellow pump 64 was used to provide oscillatory motion to the incoming flow; oscillation frequency was set in the range of 1.5-2 Hz.

Step 5:
The temperature of the oil and solution was maintained in the particular range as mentioned above. Residence time was varied in the range of 3 to 5 min based on the overall reactor volume of 18.45 mL. All the other parameters were kept constant, such as molar ratio and quantity of catalyst.

Step 6:
Sufficient rapeseed oil and NaOH and methanol solution was maintained in the feed tanks 60,61 to ensure a continuous process and the experiment was run for more than an hour. The temperature and flow rate was maintained to provide sufficient reaction time for biodiesel production. The product of the reaction was collected in product vessel 66 via chromatographic tubing 67.

Apparatus:
Reactor; Rapeseed oil (1 Liter)®; Caustic Soda, (500 gm) solid 98% pure sodium hydroxide (NaOH) Methanol, 99.8% pure (2 Liters)®; 2 nos. 500 mL glass bottles as fluid feed tanks and product vessels; 2 Precision pumps (Confluent PVM; 1 Oscillatory pump; 1 2.5 A DC regulated power supply.

Performance Characterisation of the Prototype of the Reactor of the Present Invention The mixing efficiency of the reactor was investigated using residence time distribution (RTD) study at different oscillatory flow conditions and a given net flow. During RTD study a short impulse of coloured material (tracer) is injected into otherwise colourless fluid flow inside the prototype reactor. The RTD response of the reactor depends on its mixing efficiency, which is determined by measuring the tracer concentration profile at the output of the reactor over time. The tracer concentration is proportional to the colour intensity of the solution and this is obtained by a by CCD spectrometer at the exit of the prototype reactor. A narrow RTD profile is preferable for continuous tubular reactors.

The net flow of the liquid inside of the prototype reactor during characterisation experiments was maintained at 8.33 micro liters per second ($\mu L s^{-1}$) which, considering the dimensions of the prototype reactor of the present invention resulted in Reynolds number $Re_n=2.97$.

Series of tests were performed each at speed setting of the pump causing oscillatory motion of the fluid (oscillatory pump) of 166.67 microliters per second ($\mu L s^{-1}$) and 250.00 microliters per second ($\mu L s^{-1}$).

In each set of tests the displacement of the oscillatory pump was varied from 1.67 microliters ($\mu L$) up to 16.67 microliters ($\mu L s^{-1}$) resulting each time in oscillatory motion of the fluid with different characteristics within the prototype reactor. The resulting dimensionless parameter, the Strouhal number (St) relates the amplitude of the oscillatory motion of the fluid within the prototype reactor to its diameter and shows the eddy propagation in the given geometry. For each setting of oscillatory flow conditions the Strouhal number is shown in Table 1 below.

The frequency of the oscillatory motion of the fluid was measured by measuring the frequency of the pump. The frequency for each test as well as the resulting dimensionless parameter, the oscillatory Reynolds number ($Re_O$) which measures the effective intensity of the mixing are presented in Table 2 below.

The mixing efficiency of the prototype reactor is determined by numerically fitting the experimental curves resulting from the RTD study to a "Tanks in Series" model (TIS), where tank refers to an ideal stirred tank. The model assumes that the concentration over time response of a reactor can be represented by the fluid flow cascading over a number N of equally sized tanks in series, where N is the model parameter. The best fit to the RTD profile is determined by N. The higher the efficiency of the mixing the higher is the number (N) of ideal TIS demonstrating the behaviour of the prototype reactor in each test shown in the tables below. The results demonstrated characteristic behaviour for oscillatory baffled reactors where a region of optimal performance can be found.

Experiment Data

TABLE 1

| Net Flow, µL/sec | Oscillatory Pump Displacement, µL | St | Oscillatory Pump Speed, µL/sec | Measured Frequency, Hz | $Re_O$ | TIS, N |
|---|---|---|---|---|---|---|
| 8.33 | 1.67 | 4.2857 | 250.0 | 5.6742 | 1.7426 | 8 |
| 8.33 | 3.33 | 2.1429 | 250.0 | 5.1040 | 3.0327 | 16 |
| 8.33 | 5.00 | 1.4286 | 250.0 | 4.6263 | 4.1233 | 11 |
| 8.33 | 6.67 | 1.0714 | 250.0 | 4.3183 | 5.1317 | 7 |
| 8.33 | 8.33 | 0.8571 | 250.0 | 4.0693 | 6.0448 | 5 |

TABLE 1-continued

| Net Flow, µL/sec | Oscillatory Pump Displacement, µL | St | Oscillatory Pump Speed, µL/sec | Measured Frequency, Hz | $Re_O$ | TIS, N |
|---|---|---|---|---|---|---|
| 8.33 | 10.00 | 0.7143 | 250.0 | 3.8642 | 6.8880 | 5 |
| 8.33 | 11.67 | 0.6122 | 250.0 | 3.6658 | 7.6235 | 5 |
| 8.33 | 13.33 | 0.5357 | 250.0 | 3.4940 | 8.3043 | 5 |
| 8.33 | 15.00 | 0.4762 | 250.0 | 3.3440 | 8.9411 | 5 |
| 8.33 | 16.67 | 0.4286 | 250.0 | 3.1931 | 9.4864 | 4 |

TABLE 2

| Net Flow, µL/sec | Oscillatory Pump Displacement, µL | St | Oscillatory Pump Speed, µL/sec | Measured Frequency, Hz | $Re_O$ | TIS, N |
|---|---|---|---|---|---|---|
| 8.33 | 1.67 | 4.2857 | 166.67 | 5.5807 | 1.6580 | 1 |
| 8.33 | 3.33 | 2.1429 | 166.67 | 5.0497 | 3.0004 | 25 |
| 8.33 | 5.00 | 1.4286 | 166.67 | 4.5187 | 4.0273 | 21 |
| 8.33 | 6.67 | 1.0714 | 166.67 | 4.1546 | 4.9371 | 11 |
| 8.33 | 8.33 | 0.8571 | 166.67 | 3.8354 | 5.6973 | 6 |
| 8.33 | 10.00 | 0.7143 | 166.67 | 3.5592 | 6.3444 | 6 |
| 8.33 | 11.67 | 0.6122 | 166.67 | 3.3228 | 6.9102 | 6 |
| 8.33 | 13.33 | 0.5357 | 166.67 | 3.1121 | 7.3965 | 5 |
| 8.33 | 15.00 | 0.4762 | 166.67 | 2.9333 | 7.8431 | 5 |
| 8.33 | 16.67 | 0.4286 | 166.67 | 2.7714 | 8.2334 | 6 |

EXAMPLE 2

Oxidised Trihydroxyindole (THI) Using the Reactor

Figure 7:
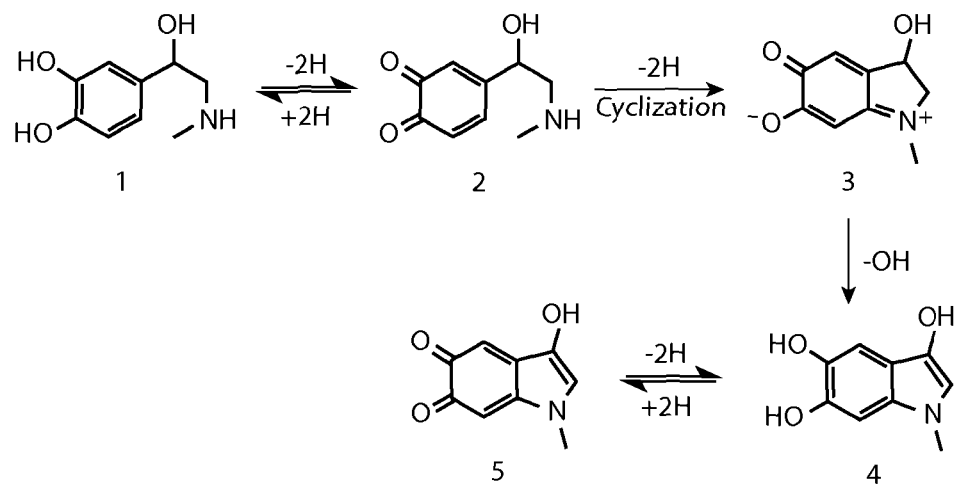
FIG. 7 shows the proposed scheme for the reaction employed in Example 2.

The dispersion and mixing efficiency of the reactor of the present invention was studied and assessed by reacting epinephrine to the oxidised trihydroxyindole (THI) product (see FIG. 7). Using this model reaction, the performance of the reactor of the invention was also compared to the performance of a standard PTFE tubular reaction vessel and to that of a standard, commercially available batch reactor. It was also compared to the performance of two type microfluidic reactors ("Residence time distribution in microchannels: Comparison between channels with herringbone structures and a rectangular channel", Cantu-Perez, A; Barrass, S; Gavriilidis, A, CHEMICAL ENGINEERING JOURNAL, 2010, Vol. 160, no. 3, pp. 834-844).

THI Oxidation Reaction:

The reaction of epinephrine (1) to the oxidised trihydroxyindole product (5) has been previously studied and a reaction mechanism proposed is shown in FIG. 7. A fluorescent intermediate (4) was observed when (1) reacts with dissolved oxygen in an alkaline solution with the maximum excitation and emission wavelength found to be 410 and 510 nm, respectively.

Epinephrine (1) and the final oxidised trihydroxyindole product (5) are non-fluorescent therefore we could observe the dispersion and mixing efficiency of the reactor of the present invention and compare to the other said apparatus by monitoring and measuring the rate of appearance and disappearance of the emission of the fluorophore intermediate (4). The quicker the emission peak appears and disappears, the more efficient the reactor.

Full Experimental Details:

The materials and apparatus used in all three experimental configurations were:

Reagents:

Stock standard solution of epinephrine hydrochloride ($10^{-2}$ mol $L^{-1}$), prepared from dissolving epinephrine hydrochloride (0.549 g, 2.49 mmol) in $10^{-2}$ mol $l^{-1}$ HCl (250 mL) (analytical grade) and kept constant at 4° C. Working solutions of required) concentration were prepared by diluting the stock standard solution of epinephrine with distilled water. A stock standard solution of NaOH (1 mol $L^{-1}$) was also prepared using commercially available NaOH in solid phase from Sigma-Aldrich and distilled water.

Figure 8:
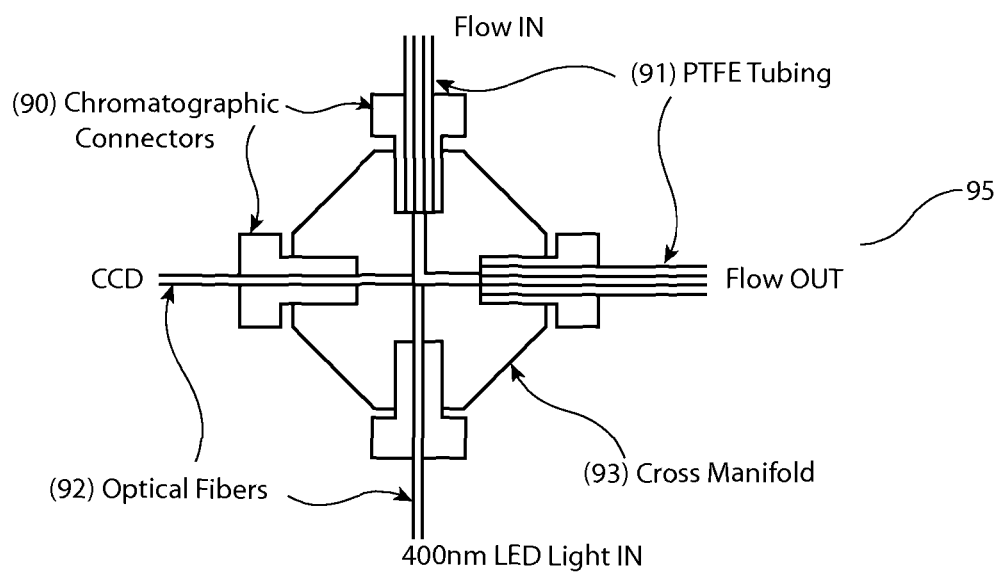
FIG. 8 is a schematic diagram of the measurement flow cell employed in Example 2.

Monitoring and Measurement Apparatus:

UV/Vis CCD Spectrometer; light source comprising 400 nm wavelength Light Emitting Diode (LED); 1 precision pump for sample collection and injection into the measurement flow cell (shown in FIG. 8); chromatographic tubing of ⅛" OD (3.175 mm) and 1/16" ID (1.5875 mm); Controller code for sample collection, injection and measurement acquisition purposely built in LabView software.

Description of the Experiments

A. THI Oxidation Using the Reactor of the Present Invention.

Figure 9:
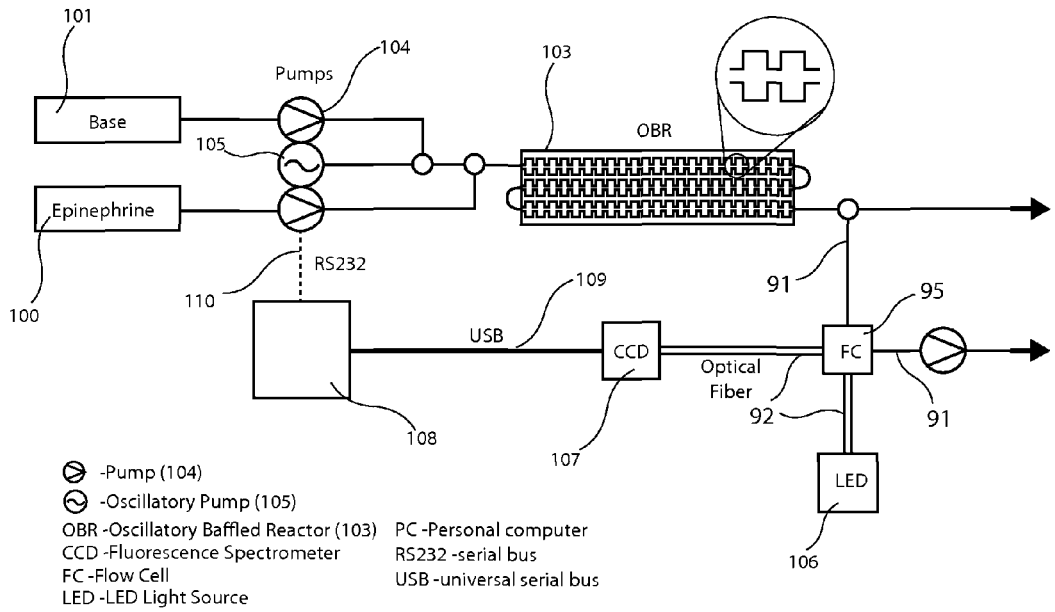
FIG. 9 is a schematic diagram showing the configuration of the apparatus used in Example 2.

The configuration for this study is shown in FIG. 9. The epinephrine solution (100) and NaOH base (101) were each injected into an oscillatory baffled reactor (103) using two precision syringe pumps (104) with total net flow of 13.67 micro liters per second. The said pumps and therefore the flow rate, were controlled by code purposely build in LabView software. A third syringe pump (105) was used to generate oscillatory motion to the incoming flow via reciprocal piston motion with displacement of 20 microliters (µL) and frequency of 3.06 Hz.

The whole system, prior to the experiment was filled in with the sodium hydroxide base solution. Emission intensity measurements of the fluorophore (4) were obtained after injecting the reaction mixture to 1 (total length of 185 mm), 2 (total length of 370 mm) and 3 (total length of 555 mm) passes through reactor 103. As the reaction mixture was exiting the reactor 103, a sample was continuously obtained and injected into the flow cell 95 of FIG. 8 at a sampling interval of 10 seconds to measure fluorescence intensity (shown in FIG. 11).

Specifically, flow cell 95 comprises PTFE tubing 91 for carrying the sample into and out of flow cell 95, and optical fibres 92 along which light can be passed to analyse the sample (see below). Cross manifold 93 supports the components which are held in place by chromatographic connectors 90.

Turning back to FIG. 9, LED 106 produces light to illuminate the sample as it passes through flow cell 95, and the resulting spectrum is analysed by fluorescence spectrometer 107 which is linked to computer 108 by USB 109. Computer 108 is also linked to and control pumps 104 by serial bus 110.

Figure 10:
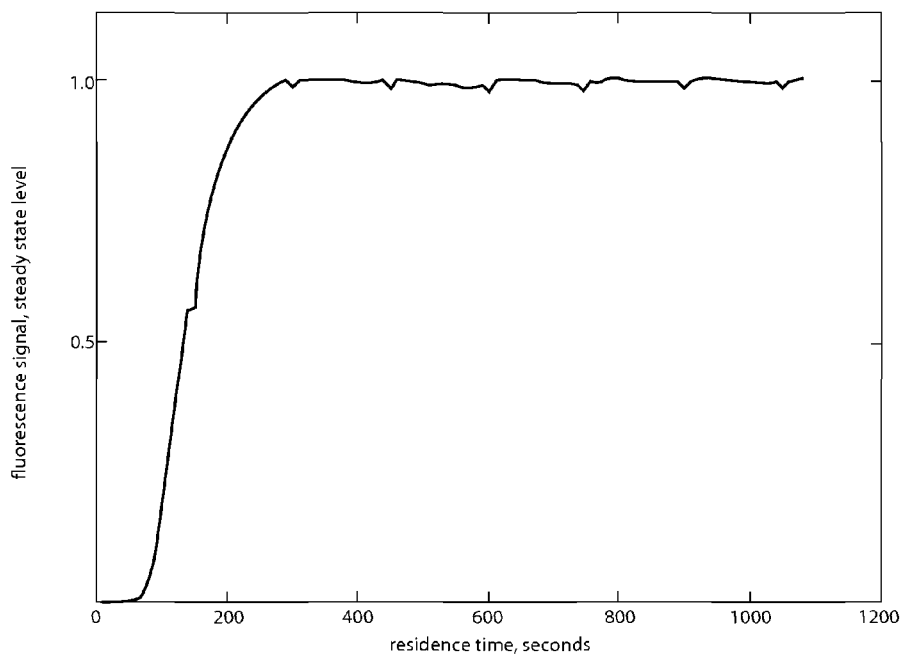
FIG. 10 is a graph showing the fluorescence response of the reaction mixture through a single pass of the reactor.

The fluorescence response of the reaction mixture through a single pass of reactor 103 is shown in FIG. 10.

B. THI Oxidation within Commercially Available PTFE Tubes.

The same reaction was performed within commercially available PTFE tubes of ⅛" OD (3.175 mm) and 1/16" ID (1.5875 mm) The experimental configuration and measurement protocol was identical to (A), shown in FIG. 9, but with the Reactor of (A) being replaced with a PTFE tube. The reaction was conducted several times and at each time, the length of the PTFE tube was increased until a reduction of the fluorescence emission was obtained, indicating conversion from (4) to (5). Eight in total PTFE tubes were used with length of 500 mm, 1000 mm, 1500 mm, 2000 mm, 2500 mm, 3000 mm, 5000 mm, and finally 8000 mm. At the exit, the fluorescence of the reaction mixture was measured by obtaining and injecting a sample into the same monitoring and measurement apparatus and flow cell used in (A) and shown in FIG. 8. For each tube the Plug Flow Time (the time it takes to fill in the given volume of the reactor at the given volumetric net flow, PFT) was calculated using the total volume of the tube and the net flow rate of the reaction mixture. Fluorescence measurements indicated steady state within each tubular reactor obtained at 2 PFTs. The fluorescence measurements of each of the eight PTFE tube reactors that used in the comparison were obtained within 2.5 to 6 PFTs.

C. THI Oxidation within a Commercially Available Batch Reactor.

Figure 12:
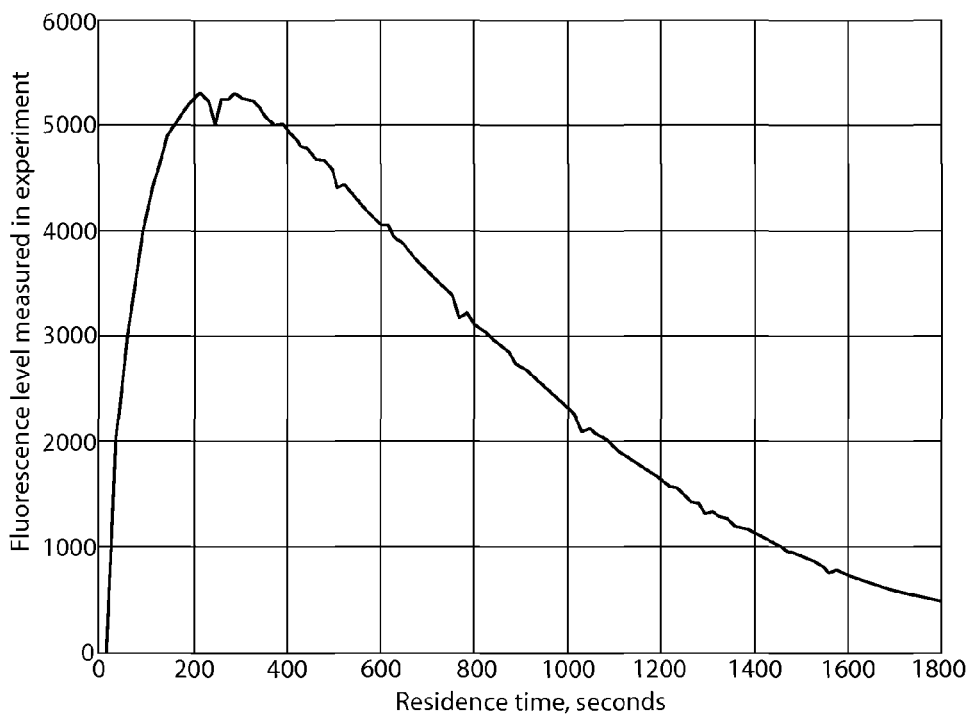
FIG. 12 is a graph showing the fluorescence response of the reaction mixture through a commercially available batch reactor.

A commercially available batch reactor with volume of 100 ml was employed. Specifically, this was a a standard low cost glass bottle with fluid ports on the cap and was purchased from Cole Palmer. Epinephrine solution (50 mL, $10^{-4}$M) was injected into the batch reactor containing 50 mL of NaOH stock solution. The mixture was continuously stirred using a commercial magnetic stirrer. The fluorescence measurement apparatus used in this configuration was identical to that of (A) and (B) allowing direct comparison. After injection of the epinephrine solution samples were obtained continuously and injected directly into the flow cell of FIG. 8 to measure at intervals of 10 seconds the fluorescence of the reaction mixture. The response of the batch reactor is shown in FIG. 12.

Observations and Comparison

Figure 11:
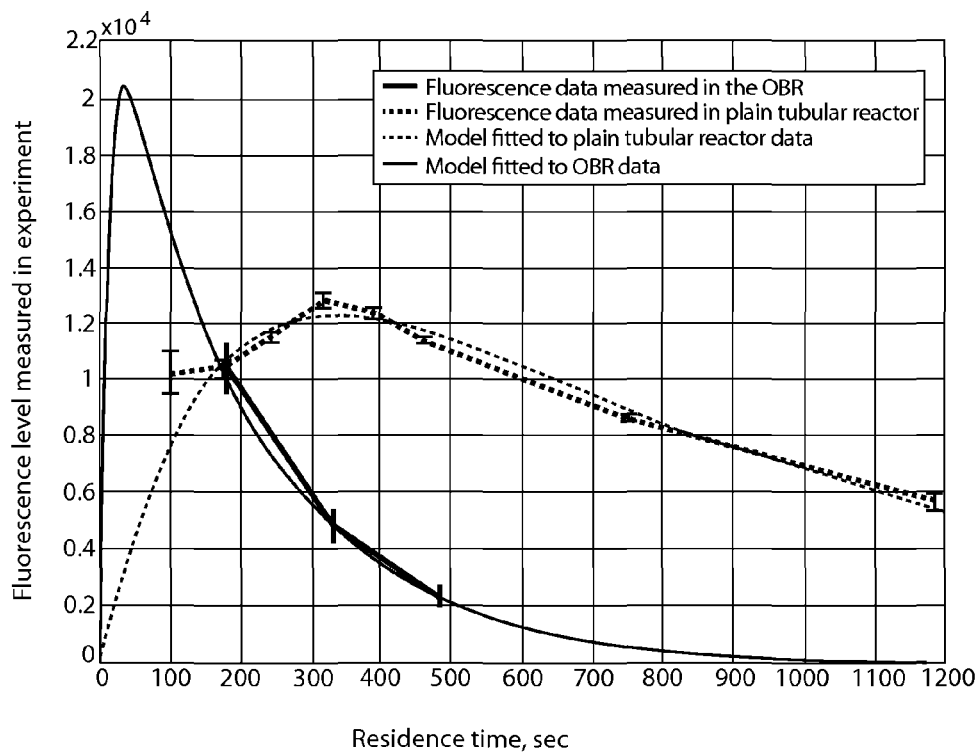
FIG. 11 is a graph comparing the fluorescence response of the reaction mixture through a the reactor and through a PTFE tube.

The performance of the Reactor in the present invention compared to the performance of the standard PTFE tube type reactor for the THI Oxidation reaction is shown in FIG. 11. Response models of the Reactor in the present invention and the PTFE tube type reactors were derived from the experimental data. The peaks in FIG. 11 indicate maximum fluorescence and therefore conversion from compounds (1), (2) and (3) to (4) shown in FIG. 7, while the decay shows conversion from (4) to (5). The curves show that even within the longest PTFE tube, the half-life of the fluorescent THI intermediate in this reactor is more than 1100 s and that the reaction does not result into complete conversion from (4) to (5). The half-life is defined as the reduction of the fluorescence of the intermediate (4) by 50% from the maximum observed, indicating that only 50% of the intermediate (4) has been converted to (5). In the case of the Reactor of the present invention, at a residence time of less than 500 s, or within 3 passes through the Reactor, fluorescence emission decreases rapidly indicating almost complete conversion from (4) to (5) has taken place. Furthermore, maximum fluorescence was observed after over 300 s in the PTFE tube reactor indicating strong presence of the intermediate compound (4) while significant fluorescence within the Reactor is observed at roughly 190 s, or at the exit of a single pass though the Reactor. The THI intermediate half-life was observed at 320 s in the Reactor compared to the 1100 s in the standard PTFE tube reactors. The fitted model predicts that the Reactor can obtain the fluorescent intermediate (4) within 30 s and complete conversion to (5) predicted to take place within roughly 1130 s.

In the batch reactor, maximum fluorescence emission was observed at roughly 250 s (shown in FIG. 12), indicating maximum concentration of the fluorescent trihydroxyindole intermediate (4). Conversion to the non-fluorescent product (5) was slow reaching 50% at 900 s. The observations show that the batch reactor was marginally more efficient in terms of conversion rate from (4) to (5) compared to the PTFE flow reactor but significantly less efficient compared to the Reactor of the present invention. The observations demonstrate significant intensification of the reaction within the Reactor compared to both the standard PTFE tube and batch reactors, conducting the reaction considerably faster. This is a highly desirable feature for process design at laboratory scale. Furthermore, the Reactor can be scaled by preferably increasing its dimensions according to the relationships defined for production at larger scales. Therefore, process design at manufacturing scales can take place in a significantly reduced size Reactor saving on materials and costs. Direct comparison between all three reactor types is shown in Table 3 below:

TABLE 3

| Reactor Type | Time the maximum fluorescence emission observed (s) | Fluorescent THI intermediate half-life observed (s) |
|---|---|---|
| Batch reactor | 250 | 900 |
| Plain PTFE tube flow reactor | 300 | 1100 |
| Reactor of present invention | 190 | 320 |

Comparison with Microfluidic Flow Reactors

A direct comparison of the performance of the Reactor in the present invention with that of microfluidic flow reactors used in "Residence time distribution in microchannels: Comparison between channels with herringbone structures and a rectangular channel", Cantu-Perez, A; Barrass, S; Gavriilidis, A, CHEMICAL ENGINEERING JOURNAL, 2010, Vol. 160, no. 3, pp. 834-844, has been possible as the chemical conditions in experiments (A), (B) and (C) are identical. The microfluidic reactors used are of a layered herringbone channel type and a standard rectangular channel type. The comparison shown in Table 4 below indicates that the Reactor of the present invention outperforms the standard rectangular type channel microreactor and that it is comparable to the herringbone type channel microreactor.

TABLE 4

| Time the maximum fluorescence emission observed, (s) | Fluorescent THI intermediate half life observed, (s) |
|---|---|
| Standard rectangular channel microreactor | 400 |
| Herringbone channel microreactor | 100 |
| Reactor of present invention | 190 |

The invention claimed is:

1. A modular flow reactor formed of a plurality of modules, wherein
   a. each module includes a body having at least one conduit passing therethrough,
   b. several of the modules are aligned along a longitudinal axis such that the conduits of the modules are aligned to form a passage for fluid, and
   c. each module has a length along the longitudinal axis which is less than the length of the module perpendicular to the longitudinal axis,
   the reactor including at least one end-cap configured to fit to at least one end of the reactor, wherein the end-cap has at least one conduit which is of smaller internal diameter than the conduit of the passage.

2. The modular reactor of claim 1 wherein:
   a. each module includes additional conduits for allowing flow of heating or cooling fluid, and
   b. the additional conduits are aligned along the longitudinal axis.

3. The modular reactor of claim 1 further including at least one reinforcing element configured to extend through the passage, whereby the reinforcing element links the modules together.

4. The modular reactor of claim 1 wherein:
   a. the reactor has at least two of the passages, and
   b. the reactor additionally includes at least one end-cap configured to fit to at least one end of the reactor, and
   c. the end-cap includes a connector configured to fluidly connect the passages together.

5. The modular reactor of claim 1 wherein at least one of the modules does not include a baffle or any other feature which disrupts flow of fluid through the at least one conduit.

6. The modular reactor of claim 1 wherein at least one of the modules has a catalyst, reactant or reagent situated so as to contact any fluid flowing through the at least one conduit.

7. The modular reactor of claim 1 wherein:
   a. at least one of the modules includes support material selected from glass beads, silica beads, quantum dots, and nanoparticles in a permeable matrix, and
   b. the support material is positioned so as to contact any fluid flowing through the at least one conduit.

8. The modular reactor of claim 1 including from 20 to 30 modules.

9. The modular reactor of claim 1 wherein the minimum dimension of each module along the longitudinal axis is from 5 mm to 15 mm.

10. The modular reactor of claim 1 including a plurality of conduits each having a baffle and a plurality of baffle-free conduits.

11. The modular reactor of claim 10 wherein:
    a. the number of conduits having a baffle is from 5 to 10, and
    b. the number of baffle-free conduits is from 15 to 30.

12. The modular reactor of claim 1 wherein each module is substantially circular in cross-section.

13. The modular reactor of claim 12 wherein the diameter of the circular cross-section is from 40 mm to 55 mm.

14. The modular reactor of claim 1 wherein at least one of the modules includes a baffle configured to disrupt flow of fluid through the conduit of the module.

15. The modular reactor of claim 14 wherein:
    a. the internal diameter of the conduit at a baffle region about the baffle is about half of the internal diameter of the conduit spaced from the baffle, and
    b. the length of the baffle region along the longitudinal axis of the conduit is about a quarter of the length of the conduit spaced from the baffle.

16. The modular reactor of claim 14 wherein at least one of the modules including a baffle has:

$$t_b/L_{bc} \leq 0.5$$

where
    a. $t_b$ is the baffle thickness along the longitudinal axis, and
    b. $L_{bc}$ is the length of the conduit of the module along the longitudinal axis.

17. The modular reactor of claim 14 wherein each module has a length T along the longitudinal axis of $$T \leq \alpha \cdot D(\gamma+1)$$

where
a. α is the ratio between $L_{bc}$ to D,
b. γ is the ratio between $L_{bc}$ to $t_b$, and
c. $L_{bc}$ is the length of the conduit of the module along the longitudinal axis,
d. D is the diameter of the conduit of the module measured perpendicular to the longitudinal axis, and
e. $t_b$ is the thickness of the baffle along the longitudinal axis.

18. A modular flow reactor formed of a plurality of modules, wherein
a. each module includes a body having at least one conduit passing therethrough,
b. several of the modules are aligned along a longitudinal axis such that the conduits of the modules are aligned to form a passage for fluid,
c. each module has a length along the longitudinal axis which is less than the length of the module perpendicular to the longitudinal axis, and
d. at least one of the modules includes at least one baffle situated to disrupt flow of fluid through the at least one conduit.

19. The modular reactor of claim 18 wherein the at least one baffle and the body are integrally formed.

20. The modular reactor of claim 18 wherein:
a. the internal diameter of the conduit at a baffle region about the baffle is about half of the internal diameter of the conduit spaced from the baffle, and
b. the length of the baffle region along the longitudinal axis of the conduit is about a quarter of the length of the conduit spaced from the baffle.

21. The modular reactor of claim 18 wherein:
a. each module includes an additional conduit for allowing flow of heating or cooling fluid, and
b. the additional conduit is aligned along the longitudinal axis.

22. The modular reactor of claim 18 further including a reinforcing element configured to extend through the passage, whereby the reinforcing element links the modules together.

23. The modular reactor of claim 18 further including an end-cap configured to fit to an end of the reactor, wherein the end-cap has a conduit which is of smaller internal diameter than the conduit of the passage.

24. The modular reactor of claim 18 wherein:
a. the aligned modules extend between first and second reactor ends,
b. the module at the first reactor end has two or more conduits passing therethrough,
b. the reactor further includes an end-cap configured to fit to the first reactor end, and
c. the end-cap has a channel defined therein, the channel connecting two or more of the conduits in the module at the first reactor end.

25. The modular reactor of claim 18 wherein:
a. the reactor has at least two of the passages,
b. the reactor additionally includes an end-cap configured to fit to an end of the reactor, and
c. the end-cap includes a connector configured to fluidly connect the passages together.

26. The modular reactor of claim 18 wherein at least one of the modules has a catalyst, reactant or reagent situated so as to contact any fluid flowing through the at least one conduit.

27. The modular reactor of claim 18 wherein:
a. at least one of the modules includes support material selected from glass beads, silica beads, quantum dots, and nanoparticles in a permeable matrix, and
b. the support material is positioned so as to contact any fluid flowing through the at least one conduit.

28. The modular reactor of claim 18 wherein at least one of the modules having at least one baffle has:

$$t_b/L_{bc} \leq 0.5$$

where
a. $t_b$ is the baffle thickness along the longitudinal axis, and
b. $L_{bc}$ is the length of the conduit of the module along the longitudinal axis.

29. The modular reactor of claim 18 wherein each module has a length T along the longitudinal axis of $$T \leq \alpha \cdot D(\gamma+1)$$

where
a. α is the ratio between $L_{bc}$ to D,
b. γ is the ratio between $L_{bc}$ to $t_b$, and
c. $L_{bc}$ is the length of the conduit of the module along the longitudinal axis,
d. D is the diameter of the conduit of the module measured perpendicular to the longitudinal axis, and
e. $t_b$ is the thickness of the baffle along the longitudinal axis.

* * * * *